United States Patent [19]

Saulters et al.

[11] Patent Number: 4,514,796
[45] Date of Patent: Apr. 30, 1985

[54] METHOD AND APPARATUS FOR CONTROLLING THE POSITION OF A HYDRAULIC BOOM

[75] Inventors: John D. Saulters, Cambridge; Roger H. Scarr, Pickering, both of Canada

[73] Assignee: Joy Manufacturing Company, Pittsburgh, Pa.

[21] Appl. No.: 415,855

[22] Filed: Sep. 8, 1982

[51] Int. Cl.³ .................. E21C 11/00; F16M 13/00
[52] U.S. Cl. .................................. 364/142; 364/513; 340/685; 182/2; 248/654; 173/43
[58] Field of Search ............... 364/142, 513; 299/1, 299/30; 340/685; 182/2; 248/654; 173/43, 38

[56] References Cited

U.S. PATENT DOCUMENTS

| | | | |
|---|---|---|---|
| 3,462,103 | 8/1969 | Strom | 248/654 |
| 3,710,368 | 1/1973 | Hamilton | 340/685 |
| 3,868,076 | 2/1975 | Beagan, Jr. | 248/654 |
| 3,973,747 | 8/1976 | Jagerstrom | 248/654 X |
| 4,037,671 | 7/1977 | Kimber et al. | 173/43 X |
| 4,230,189 | 10/1980 | Mashimo | 173/43 X |
| 4,232,849 | 11/1980 | Kimber et al. | 248/654 |
| 4,240,511 | 12/1980 | Mashimo | 173/43 X |
| 4,251,046 | 2/1981 | Walmsley et al. | 173/38 X |
| 4,266,749 | 5/1981 | Lundstrom | 182/2 X |
| 4,343,367 | 8/1982 | Mashimo | 173/43 |
| 4,364,540 | 12/1982 | Montabert | 173/43 X |

*Primary Examiner*—Jerry Smith
*Assistant Examiner*—Allen MacDonald
*Attorney, Agent, or Firm*—Raymond W. Augustin

[57] ABSTRACT

A method is set forth for controlling the orientation of an articulated boom of the type having a first portion and a second feed arm portion such that the first portion remains parallel to a predetermined position during movement of the articulated boom. The method utilizes a computer which senses the angular position of the various parts of the boom in a total of five directions and computes the required angular position of the feed arm to maintain it parallel to a set position as the boom is moved in any direction. Various hydraulic servovalves are utilized to control the flow of hydraulic fluid in a manner to maintain parallelism within ½° with the referenced position.

6 Claims, 11 Drawing Figures

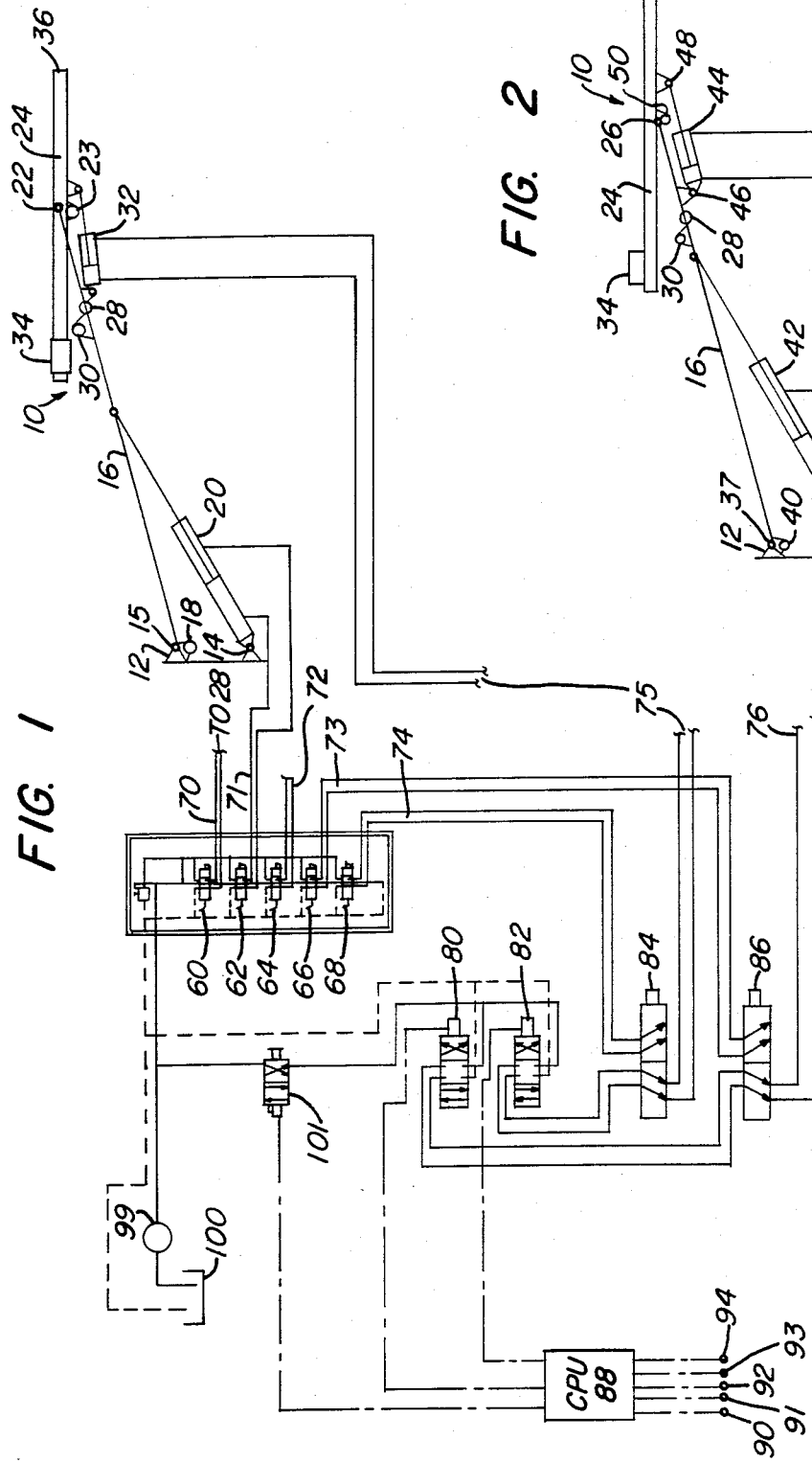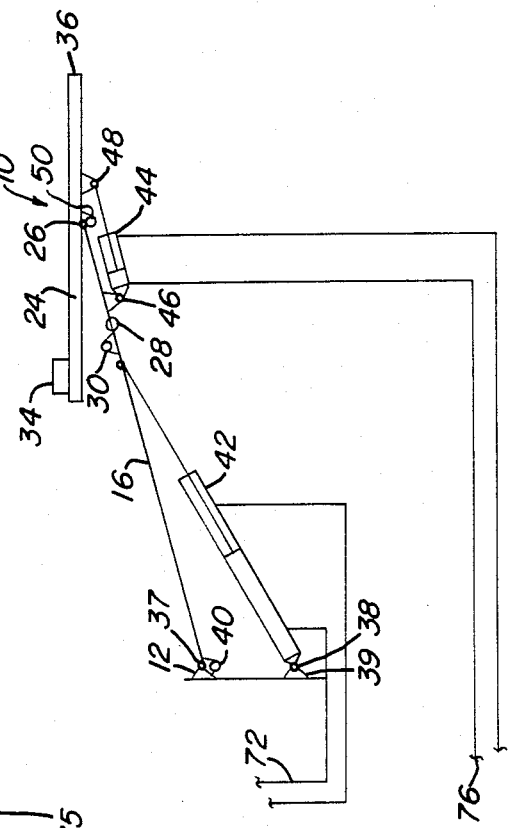

METHOD AND APPARATUS FOR CONTROLLING THE POSITION OF A HYDRAULIC BOOM

BACKGROUND OF THE INVENTION

1. Field of the Invention

This invention relates to an electronic/hydraulic control system for maintaining the orientation of a rock drill feed arm regardless of the movement of the rock drill boom. The intent of the control arrangement is to simplify drilling of parallel bores in a mine face.

2. DESCRIPTION OF THE PRIOR ART

A common method for breaking a mine or other tunnel involves the drilling of a plurality of parallel bores very near to each other in the middle of the end wall of the tunnel. A portion of these so called opening bores are charged while the other portion is left uncharged. Parallelism of the opening bores is a condition of successful blasting.

In rock drilling it is common to utilize a hydraulic boom for supporting and guiding the rock drill bit and its feeding device. The boom has a first portion which can move in several ways. Normally it can turn both in the vertical and horizontal planes and can be rotated about a longitudinal axis therethrough. A drill feed arm or second portion is attached to the end first portion of the boom and can be guided with respect to all three space axis. When the first portion of the boom is moved the position of the feed arm end and its direction of orientation are changed. If one desires to have the end of the feed arm remain in constant orientation when transferred from one bore to another the feed arm must be reoriented to maintain the desired parallel orientation. In order to maintain this parallelism prior art U.S. Pat. No. 3,462,103 issued Aug. 19, 1969 to R. Strom utilizes a purely hydraulic boom guiding arrangement for a rock drilling machine. The hydraulic cylinders are connected to a hydraulic pump which is responsive to the movement of hydraulic fluid as the boom moves and pumps such amounts of oil to the cylinders so that the feed arm end will always maintain its direction when the boom is turning.

It has been found that this system has several limitations. Due to leakage hydraulic fluid in the system there sometimes occurs a drifting movement of the feed arm end and consequently a lose of accuracy in maintaining parallelism. Furthermore there is no direct readout of the feed arm angle to insure the operator that parallelism is being maintained. In addition the purely hydraulic system does not lend itself to remote control operation. Also it is not possible to control a mining vehicle havin more than one hydraulic boom each with separate hydraulic circuits utilizing the method of U.S. Pat. No. 3,462,103.

U.S. Pat. No. 4,033,626 issued on July 5, 1977 to Dinkelbach discloses a remotely controlled tunneling machine. This system uses a laser beam and a computer to produce the desired tunnel profile. This system uses encoders or transmitters to produce output signals which indicate the displacement of the pivot arm about its axis. Also the control of the shaft position is implemented trough the use of electro hydraulic control elements or servovalves.

Other U.S. patents which disclose various electronic systems for mining and tunneling machines are U.S. Pat. Nos. 4,238,828; 4,228,508 and 4,254,993. None of the above patents disclose a method for electronically controlling the movements of a boom on a rock drilling machine. The present invention allows these movements to either be made manually or with a computer system automatically maintaining constant orientation of the feed arm. Various other movements of the feed arm can be preprogrammed into the computer to fully automate the drilling of the blast hole pattern.

SUMMARY OF THE INVENTION

It is an object of this invention to provide an electro hydraulic system for automatically controlling the movements of a rock drill boom.

It is a further object of this invention to provide an electro hydraulic system for maintaining the orientation of the boom feed arm so that all holes drilled by the feed arm are parallel.

It is yet an additional object of this invention to provide means for preprogramming a blast hole pattern within a computer which directs the bottom to drill a preporgrammed pattern of parallel blastholes.

It is still an additional object of this invention to provide a means for allowing remote readout of the drilling parameters including the location of the feed arm and the depth of the drill and the angle of the drilled hole.

It is yet a further object of this invention to provide a highly accurate control system for maintaining the orientation of a feed arm on a rock drill so that exremely accurate parallel bores can be made into a mine or tunnel face.

It is yet one more object of this invention to have all feeds on a multi-boom jumbo operate from a single reference so that they all are exactly parallel.

These and other objects of the present invention are set forth in a method for controlling the orientation of an articulated boom of the type having a first portion and a second feed arm portion such that the second portion remains parallel to a predetermined position during movement of the articulated boom. The first portion is capable of moving in a horizontal and vertical direction and is also capable of rotating about a longitudinal axis thereof. The second portion of the boom is pivotally mounted on the first portion and is capable of moving in a vertical and horizontal direction with respect to the first portion of the boom. The method comprises the steps of sensing and storing in a computer the angle of the first portion with respect to a predetermined reference angle in the horizontal, vertical and rotational direction. The angle of the second feed portion with respect to a predetermined reference angle in both the horizontal and vertical directions is also sensed and stored in the computer. The computer then calculates the horizontal and vertical angles of the second portion with respect to the horizontal and vertical references when said first portion is at the predetermined rotational reference angle and storing these calculated angles. The computer then calculates first vertical and horizontal angles each equal to the sum of the sensed first and second portion vertical and horizontal angles. As the boom is moved so that the end of the second portion approaches the next drilling point the second vertical and horizontal angles are calculated in a continuous loop. The second vertical and horizontal angles are each equal to the sum of the newly sensed first and second portion horizontal and vertical angles the computer then calculates the difference between the first and second horizontal and vertical angles. The computer then senses the new rotational angle of the first portion of the boom and calculates the actual second portion horizontal and vertical angle differences utilizing the sensed rotational angle and the stored second portion horizontal and vertical angles at said predetermined rotational reference. The computer then directs an electro hydraulic valve to move the second portion the actual difference of the vertical and horizontal angles to maintain parallelism. The computer continuously comprares the actual angular difference with the calculated difference between the first and second horizontal and vertical angles. The computer then directs the electro hydraulic valves to shut off flow of hydraulic fluid when the comparison shows substantial equality.

These and other objects of this invention will be more completely disclosed and described in the following specification, the accompanying drawings and the appended claims.

BRIEF DESCRIPTION OF THE DRAWINGS

FIG. 1 is a schematic view of the electro hydraulic control system of the present invention including a top view of the articled boom.

FIG. 2 is a schematic side view of the articulated boom of FIG. 1 including hydraulic lines from the electro hydraulic control system shown in FIG. 1.

DESCRIPTION OF THE PREFERRED EMBODIMENT

Figure 3:
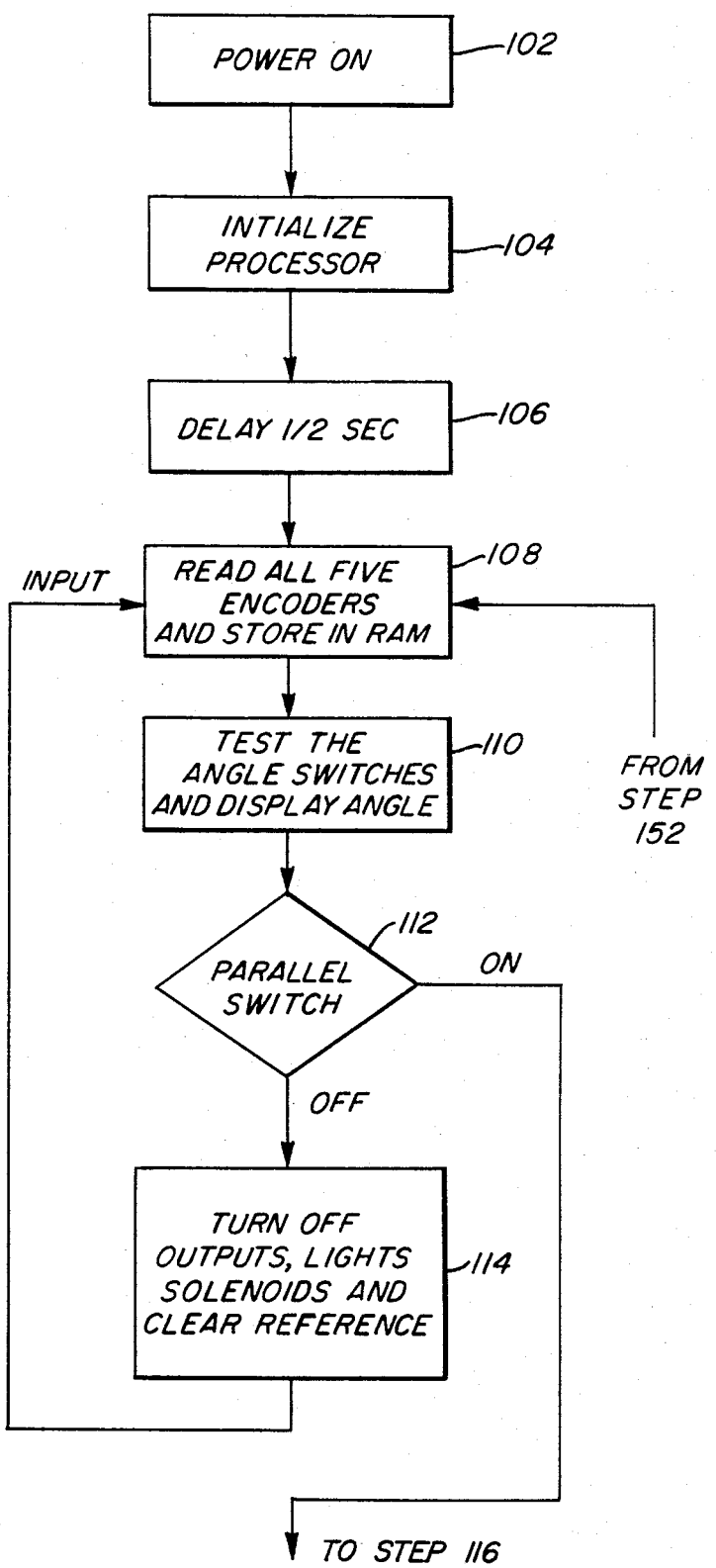
FIGS. 3 through 6 contain a logic diagram disclosing the logic utilized by the computer to control the electro hydraulic system shown in FIGS. 1 and 2.
Figure 4:
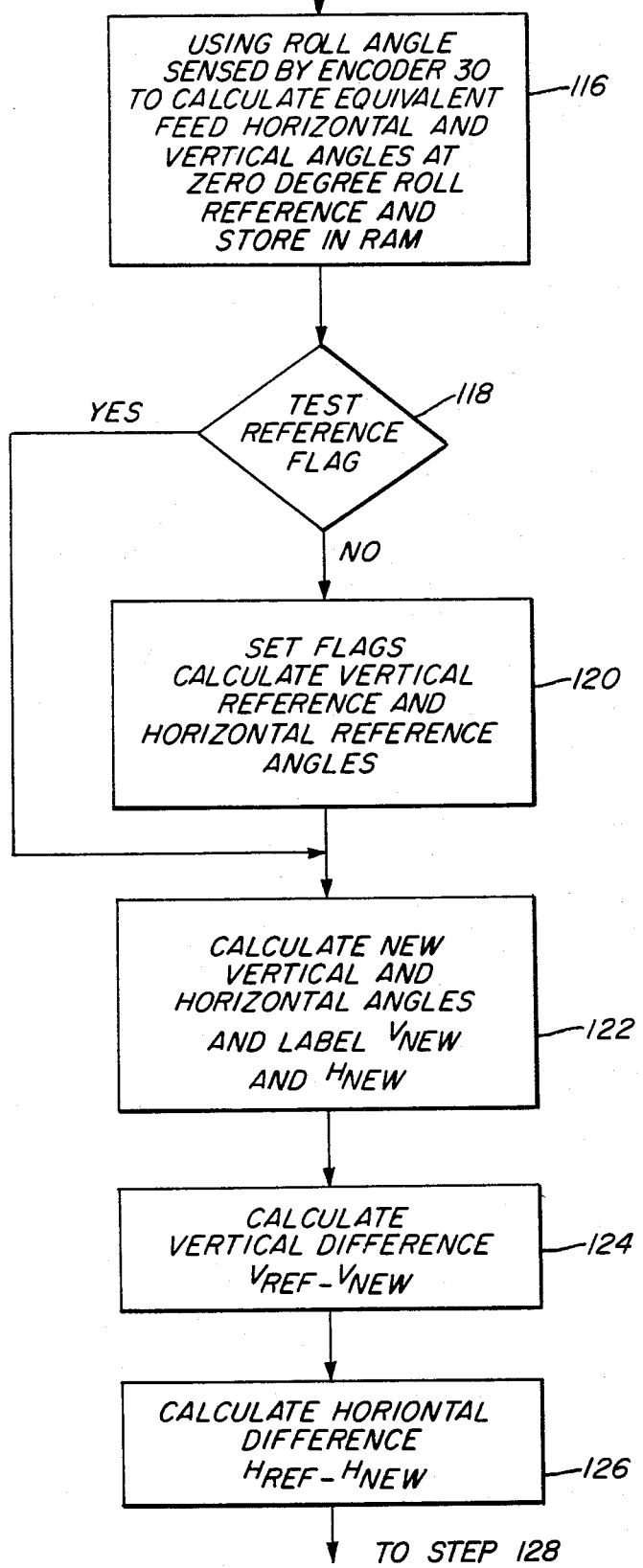
Figure 5:
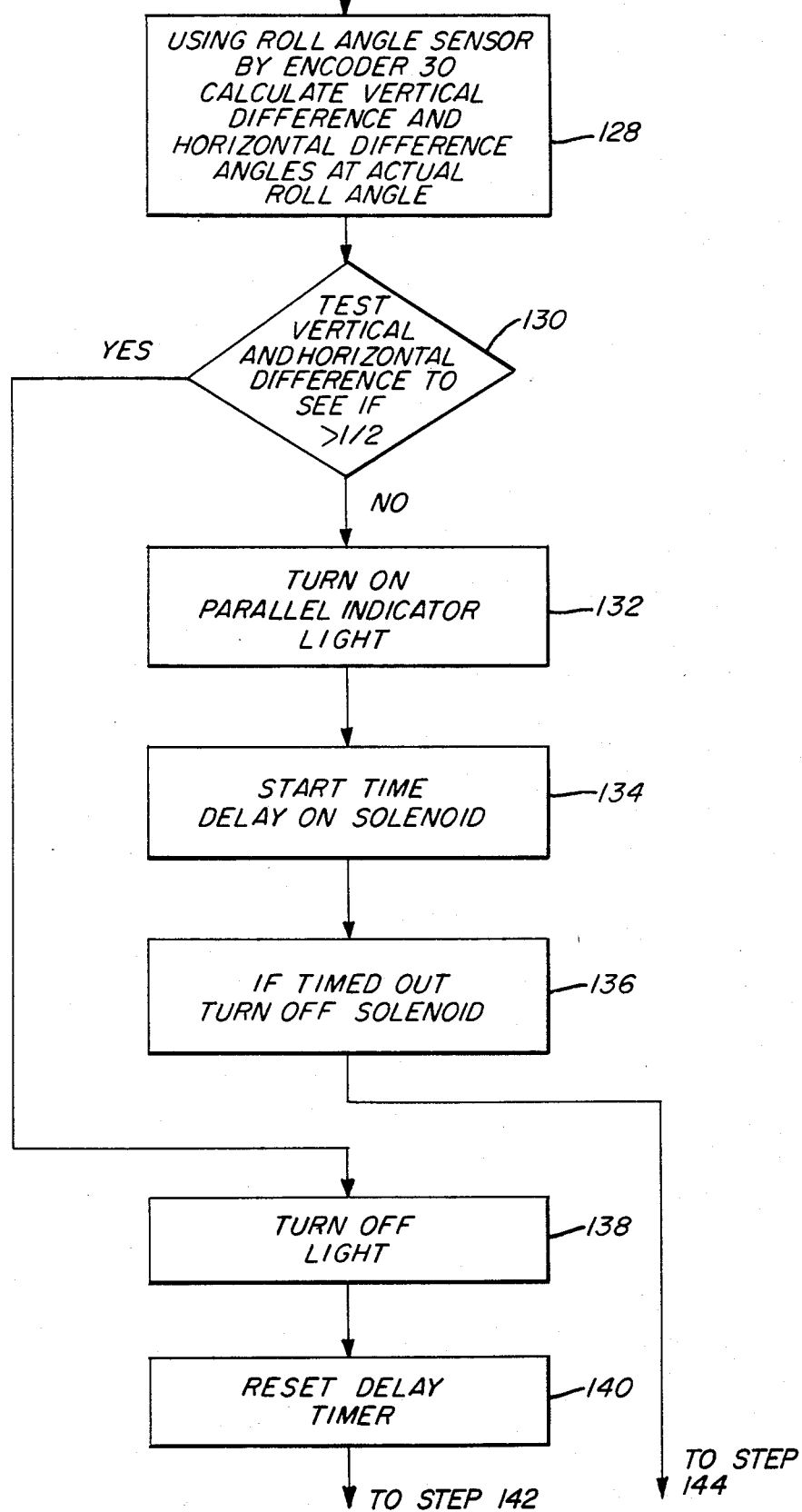
Figure 6:
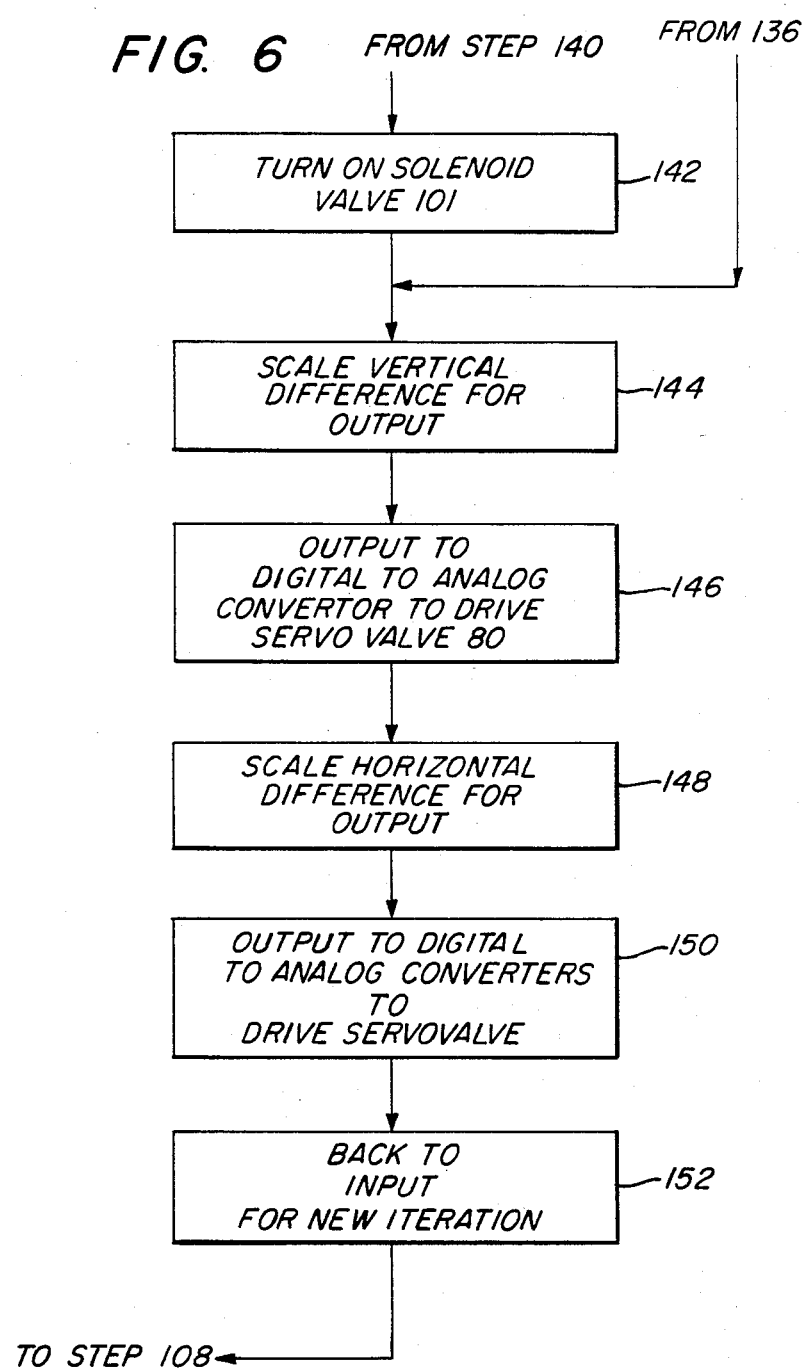

FIGS. 1 and 2 show the electro hydraulic control system of the rock drill. FIG. 1 shows the hydraulic control circuit and a schematic of the top view of a standard drill boom which is generally denoted at 10. The pivot support points 12 and 14 of the first portion 16 of the rock drill boom are attached to the drill vehicle or jumbo (not shown). The pivot point 12 has a boom swing pivot shaft 15 associated therewith to allow movement of the boom 16 in the horizontal direction. Associated with the boom swing pivot 15 is a sensing device 18 which constantly provides the horizontal position of the first portion 16 of the boom with relation to a predetermined reference angle. Attached to the pivot point 14 is a boom swing hydraulic cylinder 20 which is capable of moving the first portion 16 of the boom in a horizontal direction. The boom has a second portion 24 or feed arm which is pivotally attached to the end of the first portion 16 of the boom. The second portion or feed arm 24 can pivot both horizontally and vertically in relation to the boom portion 16. The pivot point 22 allows the second portion 24 to pivot in the horizontal direction and the pivot point 26 (see FIG. 2) allows the second portion 24 to pivot in a vertical direction. The boom 16 is also capable of rotating about its longitudinal axis at pivot point 28. This rotation is accomplished by a hydraulic device not shown. The pivoting around its axis or roll of the boom is sensed by a shaft encoder 30 mounted at pivot point 28. The location of the roll point 28 along first position 16 is unimportant as the effect on the location of feed arm 24 is the same.

In the preferred embodiment the feed arm or second portion 24 can be rotated in a horizontal direction by the action of feed swing cylinder 32. A shaft encoder 23 located at pivot point 22 continually senses the position of the feed arm in relation to a predetermined reference angle. Mounted on the feed arm for longitudinal movement along therewith is a drill 34. If desired various means can be utilized to sense the position of drill bit tip 36 if it desired to monitor the depths of the drill in any working surface. The signal from the position sensor which senses the position of the drill can be utilized by a computer to automatically control the starting and stopping of the drilling operation.

As can be seen in FIG. 2 there is a side view of the same boom 10 as is shown in FIG. 1 in which the pivot point 12 also allows rotation of the first portion of the boom 16 in the vertical direction about a boom tilt pivot shaft 37. An encoding device 40 located on shaft 37 provides a continual reading of the angle of the boom 16 with respect to a vertical reference angle. The first portion of the boom 16 is moved in the vertical direction by a boom lift cylinder 42 which pivots in a vertical direction about point 38. Point 38 is also attached to the chassis of the drill vehicle (not shown) at pivot support point 39. A feed tilt cylinder 44 is provided to rotate the feed arm 24 in the vertical direction. The feed cylinder is pivotally attached to boom 16 at point 46 and to feed arm 24 at point 48. A shaft encoder 50 is located on shaft 26 to continually sense the vertical movement of feed arm 24 with respect to a vertical reference angle.

In the preferred embodiment the cylinders 20 and 42 can be manually actuated by hydraulic valves 64 and 66. The boom roll actuator at pivot point 28 can be manually controlled by the boom roll hydraulic valve 60.

In the preferred embodiment the feed swing cylinder 32 and the feed tilt cylinder 44 may be selectively controlled by either manual feed tilt hydraulic valve 66, manual feed swing hydraulic valve 68 or automatically by feed tilt servovalve 80 and feed swing servovalve 82. A feed tilt selector valve 86 determines which mode (manual or automatic) of operation is selected. If one is seeking to maintain the feed arm 24 in a orientation parallel to a predetermined, preprogrammed referenced orientation then the computer 88 will take the readings from the various angular position sensing devices and calculate appropriate oil flows through the servovalves 80 and 82 and selector valves 84 and 86 via lines 75 and 76 to continuously move the feed swing cylinder 32 and the feed tilt cylinder 44 in a manner which will maintain feed arm 24 parallel to the predetermined reference regardless of the vertical, horizontal or rotational movement of the first boom portion 16.

In the preferred embodiment the selector valves 84 and 86 are required so that either automatic or manual control of the feed arm 24 vertical and horizontal position can be accomplished. When the selector valves 84 and 86 are in the manual position then manual valves 66 and 68 can be used by the drill operator to move the feed arm to any desired position.

While in the preferred embodiment only feed swing cylinder 32 and feed tilt cylinder 44 are controlled by the computer 88 via servovalves 80 and 82, It can be seen that cylinders 20 and 42 and roll device 28 could also be controlled by the computer 88 with the addition of three more servovalves. This would enable the entire boom system 10 to be automatically controlled.

In the preferred embodiment computer 88 is connected by a standard multiconductor electrical cable to the shaft encoders 18, 23, 30, 40, and 50 shown as electrical wires 90,91,92,93 and 94.

The preferred position sensing device is a shaft encoder which is an 8 bit absolute encoder providing a distinct reading for each of 256 positions around the 360° shaft. It has been found that a BEI Industrial Encoder Division heavy duty type H25 8 bit (256 count) absolute position encoder will fulfill the requirements of the present invention.

Encoders are mounted in such a way as to give a gear ratio to yield a 0.4° accuracy in the readings. Better accuracy can be obtained by using more sensitive encoders.

Figure 8:
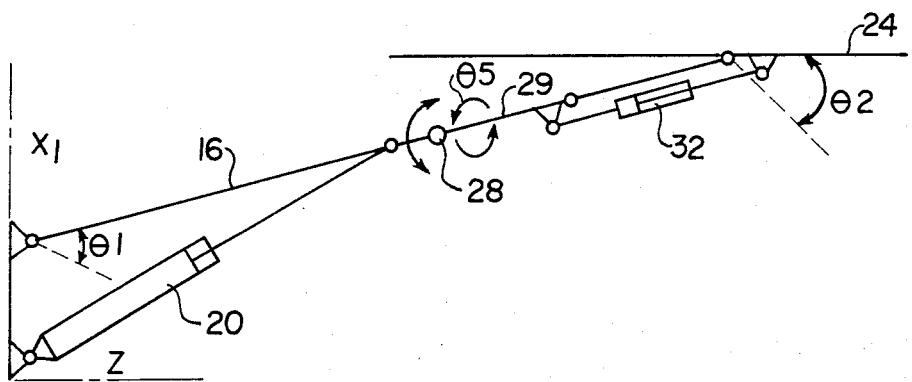
FIGS. 8 and 9 show a top view of the articulated boom of the present invention including the controllable angular movements thereof.
Figure 9:
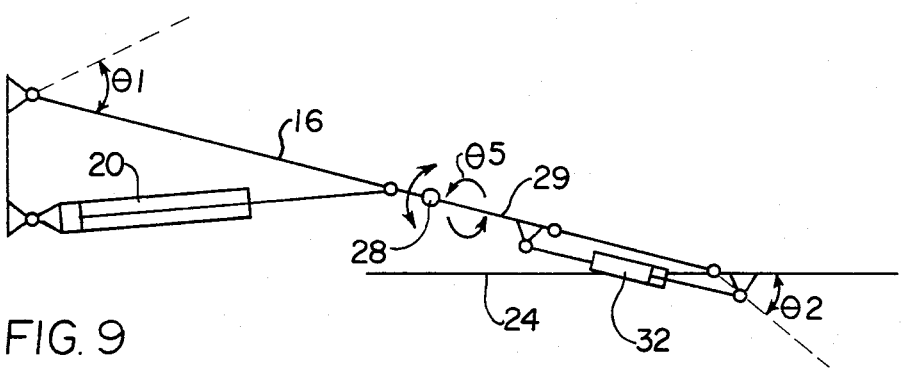
Figure 10:
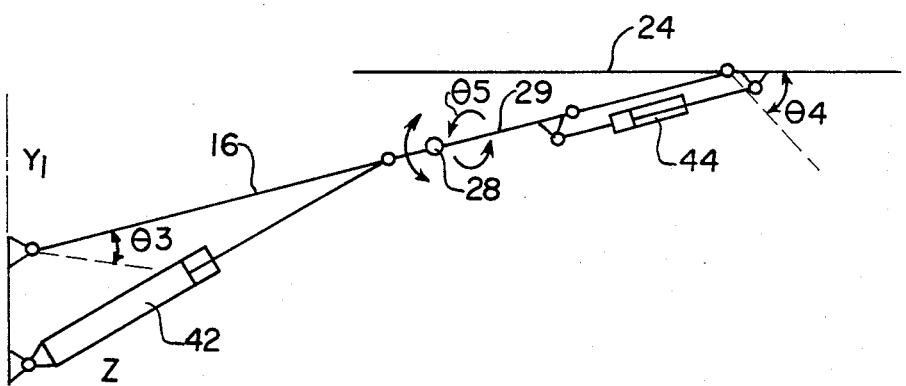
FIGS. 10 and 11 show a side view of the articulated boom of the present invention including the controllable angular movements thereof.
Figure 11:
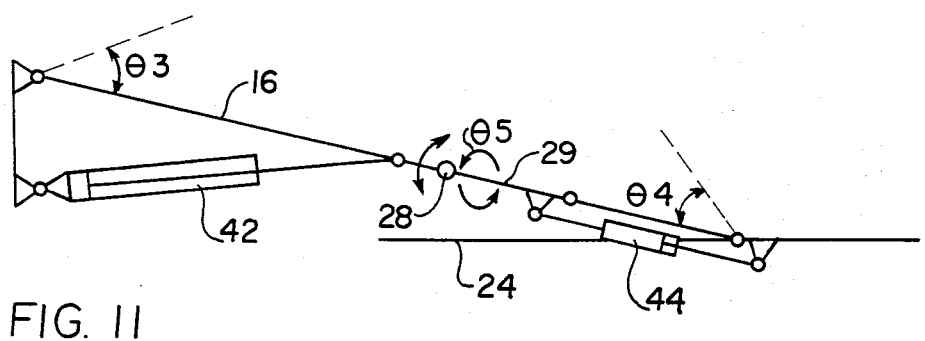

To more easily follow the hydraulic circuit shown on both FIGS. 1 and 2, hydraulic lines for the boom roll actuator 28 have been numbered 70, for the boom swing cylinder 20 have been numbered 71 and for the boom lift cylinder 42 have been numbered 72, the feed swing cylinder 32 have been numbered 74 and for the feed tilt cylinder have been numbered 73. Hydraulic lines for automatic control to cylinders 32 and 44 have been labeled 75 and 76 respectively. This numbering will hopefully help the transition between FIG. 1 and FIG. 2 as far as input and output of hydraulic fluid to the various cylinders. The controllable angular movements of the first portion 16 and the feed portion 24 are best shown in FIGS. 8 thru 11. As seen in FIGS. 8 and 9 the first portion 16 can be moved in the horizontal $X_1$-Z plane thru the angle $\theta_1$ by action of the boom swing hydraulic cylinder 20. The feed portion 24 can also be moved thru the angle $\theta_2$ in the horizontal plane by the action of feed swing cylinder 32.

Similarly the first portion 16 may be moved thru the angle $\theta_3$ in the vertical $Y_1$-Z plane by the action of hydraulic cylinder 42. Also the feed portion 24 can be moved thru an angle $\theta_4$ in the vertical plane by the vertical cylinder 44.

The end 29 of boom 16 is capable of rotating about its longitudinal axis thru an angle $\theta_5$. This angle may be as great as 360°.

Angles $\theta_1, \theta_2, \theta_3, \theta_4$ can easily be varied by varying the length of the strokes of hydraulic cylinders 20, 32, 42 and 44 or by varying the location of the mounting positions of these cylinders with respect to the boom 16, feed 24 and the location of points 12, 14 and 39.

The flow diagram shown in FIGS. 3, 4, 5 and 6 display the logic utilized by the computer or microprocessor 88 to control the electro hydraulic circuit of FIGS. 1 and 2. The first step 102 is to turn power on, this is followed by initializing the processor shown as step 104 during which the ram is cleared and then loaded with required constants for the system, step 104 could include the input of various instructions including various predetermined drill points to which the feed arm drill is to be directed to complete a predetermined blasthole drill pattern in a ground or rock surface. Step 106 is a built-in delay of about ½ sec. to allow the lights inside the optical shaft encoders to come on before any angle readings are taken. In the preferred logic flow the next step 108 is the reading of the five shaft encoder angles, the feed tilt, boom lift, feed swing, boom swing and boom roll. These angles are sensed and then stored within the computer memory. If desired the next step may be to test the angle switches which will display each angle for visual readout. In the preferred logic the next step is to input the orientation of the drill feed arm and the position feed arm which it is desired to be maintained parallel to at all times. It can be seen that a preprogrammed drill pattern with varying boom feed angles could be programmed into the computer at this point. Of course this would change the following logic flow. However, in the preferred embodiment if the parallel switch is turned off the previous reference is cleared to allow resetting the angle of the feed arm 24 to a different setting and maintaining parallelism at that setting throughout the motion of the first portion 16. In the preferred logic the next step is to use the roll angle of the first portion 16 to calculate equivalent feed arm 24 tilt and feed arm 24 swing angles at a zero degree roll reference angle and these angles are then stored in the memory of the computer. The actual equations used in this step 116 are the following:

$$X' = X \cos \beta - Y \sin \beta$$

$$Y' = X \sin \beta - Y \cos \beta$$

Where
 $X'$=vertical angle of arm 24 at 0° roll reference
 $Y'$=horizontal angle of arm 24 at 0° roll reference
 $\beta$=roll angle of the first portion as sensed by encoder 30
 $X$=actual vertical angle of arm 24. (vertical angle)
 $Y$=actual horizontal angle of arm 24. (horizontal angle)

The above angles represent the vertical angle and horizontal angle of the second portion of the boom in order to maintain parallelism of the feed arm portion 24 as the first portion is rotated from the 0° reference position. The next logic step 118 sets a reference flag which indicates it is the first calculation of a new reference point and stores it in the memory and then sets reference flags so these memory locations won't be altered on the next program loop. The next step 120 is to calculate the vertical reference, horizontal reference angles. These angles are based on the predetermined orientation of the boom. The vertical reference angle equals the first portion 16 vertical angle plus the feed 24 vertical angle ($X'$) and the horizontal reference angle equals the first portion 16 horizontal angle plus the feed 24 horizontal angle ($Y'$). Once these reference angles are calculated logic step 122 indicates that as the boom is moved the new sums of the boom and feed angles for the horizontal and vertical are calculated. These angles are subtracted from the above calculated reference vertical and horizontal angles in steps 124 and 126 to determine a vertical difference angle and a horizontal difference angle. By using the actual roll angle the computer calculates the actual vertical difference and the actual horizontal difference angles for the feed. The equations used to do this in step 128 are:

$$X = X'' \cos \theta + Y'' \sin \theta$$

$$Y = -X'' \sin \theta + Y'' \cos \theta$$

Where
 $X$=actual vertical difference angle (feed arm)
 $Y$=actual horizontal difference angle (feed arm)
 $X''$=vertical difference at 0° roll (feed arm)
 $Y''$=horizontal difference at 0° roll (feed arm)
 $\beta$=actual roll angle as sensed by encoder 30

Step 130 tests the actual and reference vertical and horizontal angles to see if the difference is less than ½°.

If this is the case then parallelism has been maintained. If this is the case the steps 132 through 136 indicate that the parallelism light comes on if the difference is greater than ½° the parallelism light is off as indicated in step 138 and the delay timer is reset. Step 142 indicates the solenoid 101 is turned on and then step 144 is accomplished. These steps are required due to leakage of oil through servovalves because the feed would move even when this was not desired. A solenoid shut off vavle closes off oil supply to servovalves. A timer is used to turn valve on or off. The solenoid is left on for 2 seconds after desired position is reached.

From here the preferred logic is to send the output from the couputer to a digital to analog converter which drives the vertical servovalve in step 146. The horizontal difference is then converted into an output from the computer which is again converted from digital to analog signal by a converter to drive the horizontal servovalve. The servovalves are shown in FIGS. 1 and 2 and meter hydraulic fluid to the cylinders causing the movement of the feed arm in both the horizontal and vertical directions to maintain parallelism. The logic diagram then loops back to the input step of step 108. Iterations of course take place at a very high speed, many times a second, so that the feed arm is constantly seeking the parallel point as the entire boom is moved.

From the above description it can be seen that the feed arm 24 can be set at the desired direction in the vertical and horizontal directions by moving the feed swing and feed tilt valves 66 and 68 respectively when the selector valves 84 and 86 are in the manual position. When the desired direction is achieved, the parallel lock switch is turned on (step 112). This acts to preprogram the computer feeding in the vertical and horizontal angles for which the feed arm 24 is to be maintained in parallel orientation 2. If it is desired to preprogram the reference orientation in the computer 88 this step is eliminated. Of course the logic would then be set up in a slightly different manner in that step 112 would indicate that the angles are simply preprogrammed into the computer by a punch card or other well known means.

The angle sensing devices or shaft encoders 18, 23, 30, 40 and 50 then read the angles at the pivot points 15, 28, 22, 37 and 26. This information is then read into the computer which calculates a reference angle for the original position. This reference angle is then stored in the computers memory.

If it is desired to reach a new position which is vertically above or below the previous one the boom lift valve 64 is moved. This will cause the boom lift cylinder 42 to lift or lower the first portion of the boom 16. The computer will then perform calculations which will generate a new feed tilt (vertical) and a new feed swing (horizontal) angle. It can be seen that the feed swing angle will not change if the boom roll angle has not been changed. This can be seen from the formulae set forth above. The computer 88 will then send a voltage to the servovalves 80 and 82 to open them in the proper direction and the proper amount thus allowing hydraulic oil to be pumped from pump 99 out of tank 100 to the feed tilt or feed swing cylinders 32 and 44 respectively thereby moving the feed arm 24 to the proper position. The servovalves 80 and 82 will remain open until the feed arm 24 has reached its final position and the new calculated angle is substantially the same as the reference angle (within ½°). The same procedure is followed for a movement of the horizontal plane except that the boom swing valve 62 is moved to swing the boom portion 16 in a horizontal direction.

It must be noted that the calculations in the computer are done many times a second and there is no discernable lag between the movement of the boom 10 and the feed arm 24. When the boom portion 16 is rolled to any angle other then 0° plus or minus 90° or plus or minus 180° it is necessary for both the feed tilt (vertical) and the feed swing (horizontal) angles to change is the boom portion 16 is either moved in the horizontal or vertical direction. This is accomplished in the same manner as if the boom portion 16 were at a 0° reference roll angle but in this case the new feed arm horizontal and feed arm vertical angles are both greater or less than 0°. Again this can be seen from the formula set forth above.

At plus or minus 90° roll angle the boom lift cylinder 42 will control the horizontal and vertical angles of the feed arm. At plus or minus 180° the vertical angle of the boom portion 16 will control the feed arm vertical angle but the direction is reversed. The horizontal boom angle will control the feed horizontal angle but again the direction will be reversed.

Figure 7:
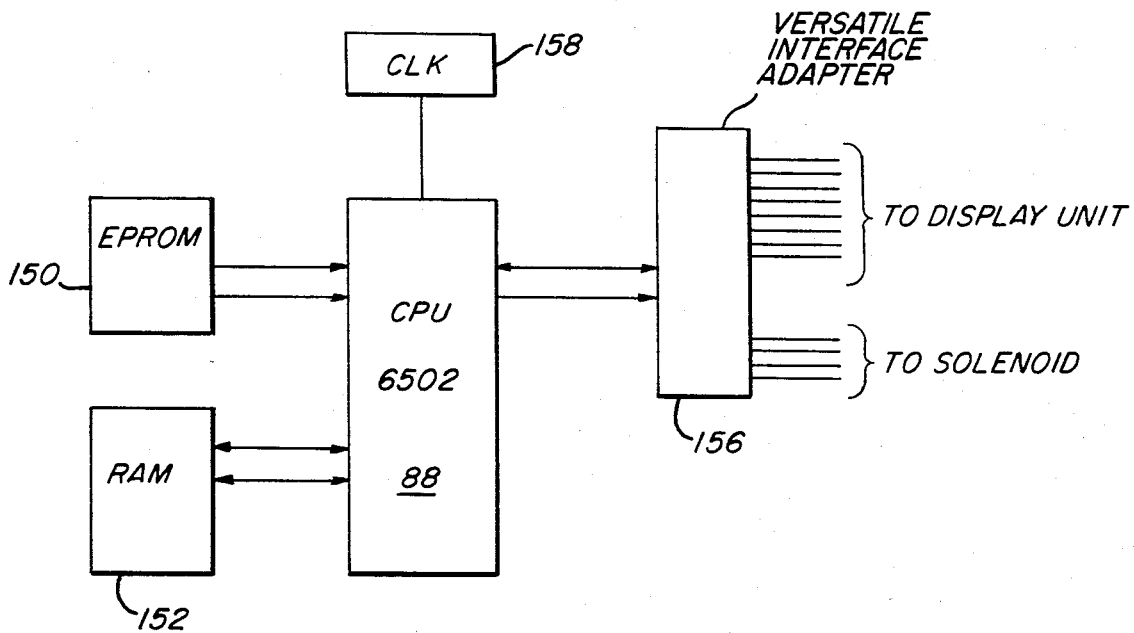
FIG. 7 is a schematic of the preferred central processing unit utilized in the present invention.

The preferred microprocessor 88 is a standard 6502 8 bit processor. FIG. 7 diagramatically illustrates the preferred processor or CPU 88. In the preferred embodiment a random access memory (RAM) is used to store the various angles sensed by the encoders. The object code or instructions for the CPU are stored in a read only memory (ROM) 150. In the preferred embodiment the ROM 150 is of the erasable and reprogrammable type. Also in the preferred embodiment a versatile interface adapter 156 is utilized as an input and output port to monitor switches and operate displays and also to control the solenoid valve 1. Incorporated with the central processing unit is a clock timing base for the microprocessor 158.

Changes may be made in the construction and the operation of various components and assemblies described herein and in the various steps and in the sequence of steps of the method described herein without departing from the spirit and scope of the invention as defined in the following claims.

We claim:

1. A method for controlling orientation of an articulated boom of the type having a first portion and a second portion, said first portion capable of moving in a horizontal and vertical direction and capable of rotating about a longitudinal axis thereof;

said second portion of said boom pivotally mounted on said first portion and capable of moving in a vertical and horizontal direction with respect to said first portion, said method comprising the steps of:

sensing and storing in a computer means the actual angles of said first portion with respect to a reference angle in the horizontal, vertical and rotational directions;

sensing and storing in a computer means the actual angle of said second portion with respect to a reference angle in both the horizontal and vertical directions;

inputting the predetermined horizontal and vertical angles of said predetermined position of said second portion into said computer;

calculating in said computer means the equivalent horizontal and vertical angles of said second portion with respect to said horizontal and vertical predetermined angles when said first portion is at said rotational reference angle and storing said calculated equivalent angles;

calculating in said computer means first vertical and horizontal angles each equal to the sum of the actual first portion vertical and horizontal angles and said second portion calculated equivalent horizontal and vertical angles;

moving said end of said second portion of said boom to a predetermined point;

calculating continuously, while said movement is occurring, second vertical and horizontal angles each equal to the sum of the newly sensed actual first and second portion vertical and horizontal angles;

calculating the reference difference between said first calculated vertical and horizontal angles and said second calculated vertical and horizontal angles;

sensing the actual rotational angle of said first portion;

calculating the actual horizontal and vertical difference angles utilizing said actual rotational angle and said calculated reference difference between said first calculated and said second calculated vertical and horizontal angles;

continuously moving said second portion in said vertical and horizontal direction to reduce said actual differences;

continuously comparing the calculated actual horizontal and vertical angular differences with the references differences between the first calculated and second calculated horizontal and vertical angles; and stopping movement when the comparison between said differences shows substantial equality.

2. A method for controlling the orientation of an articulated boom as set forth in claim 1 wherein said predetermined point for said end of said second portion is one of a plurality of predetermined points the location of which is preprogrammed in said computer.

3. An apparatus for keeping a boom mounted feed arm of the type capable of moving in a horizontal and vertical direction about a pivot point on the end of said boom parallel to a predetermined position throughout vertical, horizontal and rotational movement of said boom about a pivot point, said apparatus comprising:

means for continuously sensing and recording the actual angle of said boom in the horizontal, vertical and rotational direction with respect to a reference position;

means for continuously sensing and recording the actual angle of said feed arm in the horizontal and vertical direction with respect to a reference position;

means for inputting the vertical and horizontal angles of said predetermined position of said feed arm;

means for moving said boom to a next predetermined position;

computer means for storing said predetermined position of said feed arm and for calculating continuously horizontal and vertical angles for said feed arm to maintain parallelism with said predetermined position based on the changes in said horizontal, vertical and rotational boom angles as said boom moves; and means for continuously moving said feed arm to said calculated vertical and horizontal angles for said feed arm to maintain parallelism with said predetermined position.

4. An apparatus set forth in claim 3 wherein said computer means is capable of storing a plurality of predetermined positions and capable of directing said means for moving said boom to said predetermined positions.

5. A method for keeping a boom feed arm of the type capable of moving in a horizontal and vertical direction about a pivot point on the end of said boom, parallel to a predetermined position throughout vertical, horizontal and rotational movement of said boom about a pivot point, said method of comprising the steps of:

sensing and recording the actual angle of said boom with respect to a reference angle in the horizontal, vertical and rotational direction;

sensing and recording the actual angle of said boom with respect to a reference angle in the horizontal, vertical and rotational direction;

inputting the vertical and horizontal angles of said predetermined position of said feed arm;

moving said boom to a second position;

calculating continuously with the use of a computer means horizontal and vertical angles for said feed to maintain parallelism with said predetermined position based on the changes in said horizontal, vertical and rotational angles of said boom; and continuously moving said feed arm to said calculated angles for said feed arm to maintain parallelism with said predetermined position.

6. A method for controlling orientation of an articulated boom of the type having a first portion and a second portion, said first portion capable of moving in a horizontal and vertical direction and capable of rotating about a longitudinal axis thereof;

said second portion of said boom pivotally mounted on said first portion and capable of moving in a vertical and horizontal direction with respect to said first portion, said method comprising the steps of:

sensing and storing in a computer means the actual angles of said first portion with respect to a reference angle in the horizontal, vertical and rotational directions;

sensing and storing in a computer means the actual angle of said second portion with respect to a reference angle in both the horizontal and vertical directions;

inputting the predetermined horizontal and vertical angles of said predetermined position of said second portion into said computer;

calculating in said computer means the equivalent horizontal and vertical angles of said second portion with respect to said horizontal and vertical predetermined angles when said first portion is at said rotational reference angle using the following equations and storing said calculated angles;

$$X' = X \cos \beta - Y \sin \beta$$

$$Y' = X \sin \beta - Y \cos \beta$$

where
- $X'$ = vertical angle at predetermined rotational reference
- $Y'$ = horizontal angle at predetermined rotational reference
- $\beta$ = rotational angle of the second portion
- $X$ = vertical angle of the second portion
- $Y$ = horizontal angle of the second portion calculating in said computer means first vertical and horizontal angles each equal to the sum of the actual first portion vertical and horizontal angles and said second portion calculated equivalent horizontal and vertical angles;

moving said end of said second portion of said boom to a predetermined point;

calculating continuously, while said movement is occurring, second vertical and horizontal angles each equal to the sum of the newly sensed actual first and second portion vertical and horizontal angles;

calculating the reference difference between said first calculated vertical and horizontal angles and said second calculated vertical and horizontal angles;

sensing the actual rotational angle of said first portion;

calculating the actual horizontal and vertical difference angles utilizing said actual rotational angle and said calculated reference difference between said first calculated and said second calculated vertical and horizontal angles using the following equations;

$$X = X' \cos \theta + Y' \sin \theta$$

$$Y = X' \sin \theta + Y' \cos \theta$$

Where
- $X$ = actual vertical difference angle
- $Y$ = actual horizontal difference angle
- $X'$ = vertical difference at 0° roll
- $Y'$ = horizontal difference at 0° roll
- $\theta$ = actual rotational angle continuously moving said second portion in said vertical and horizontal direction to reduce said actual differences;

continuously comparing the calculated actual horizontal and vertical angular differences with the references differences between the first calculated and second calculated horizontal and vertical angles; and stopping movement when the comparison between said differences shows substantial equality.

* * * * *